N. E. MEREDITH.
VEHICLE WHEEL.
APPLICATION FILED APR. 4, 1908.
910,009.
Patented Jan. 19, 1909.
2 SHEETS—SHEET 1.
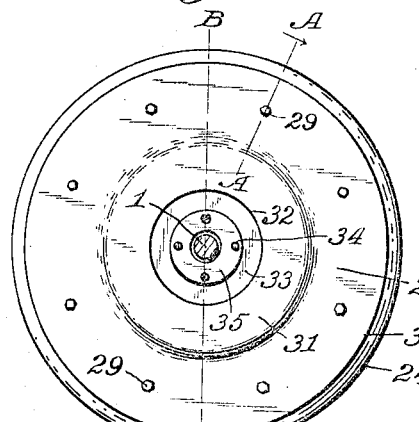
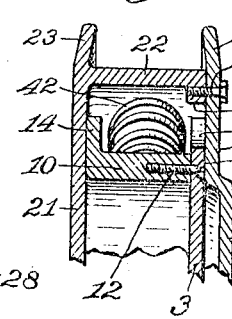
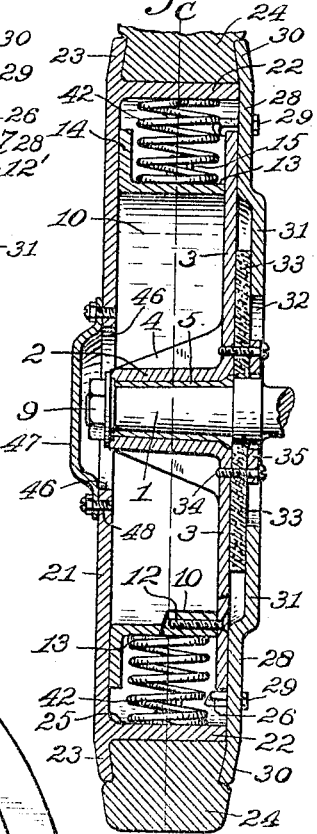
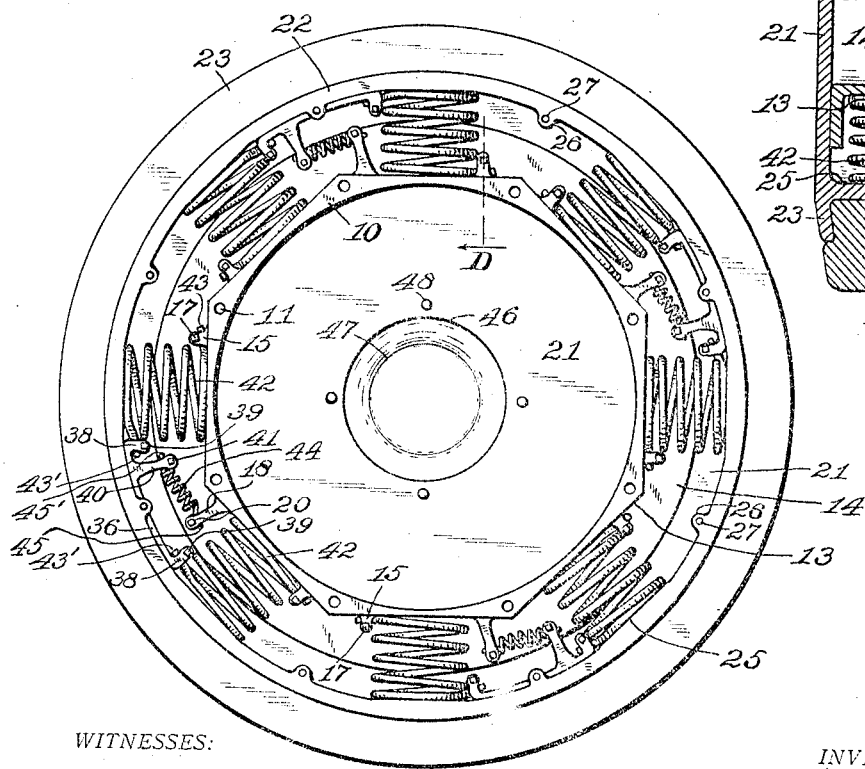
WITNESSES:
J. H. Gardner
K. R. Voddell
INVENTOR:
Noah E. Meredith,
BY
E. T. Silvius,
ATTORNEY.

N. E. MEREDITH.
VEHICLE WHEEL.
APPLICATION FILED APR. 4, 1908.
910,009.
Patented Jan. 19, 1909.
2 SHEETS—SHEET 2.
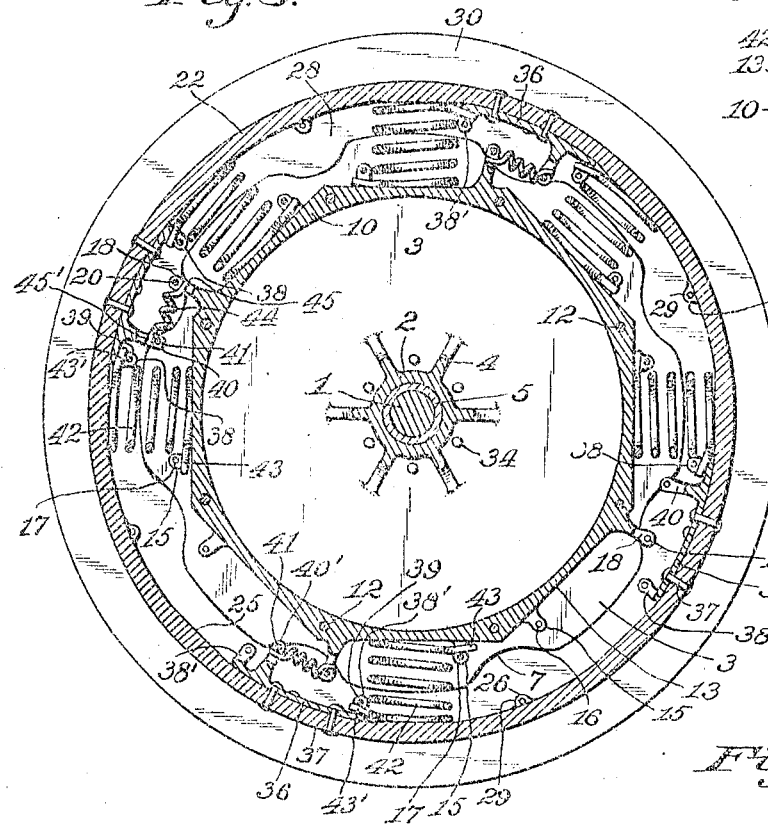
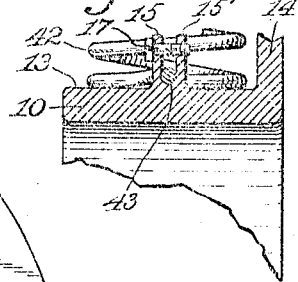
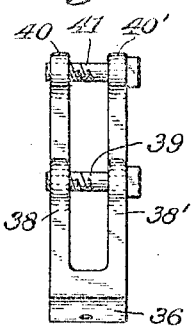
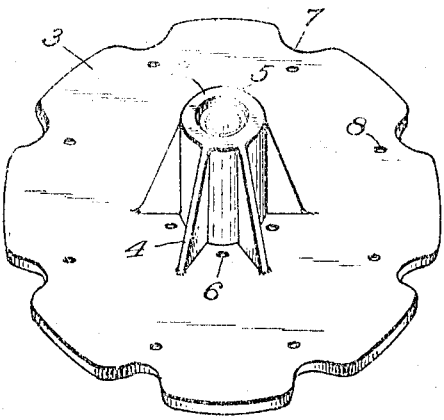
WITNESSES:
J. H. Gardner
K. R. Woddell
INVENTOR:
Noah E. Meredith,
BY
E. T. Silvius,
ATTORNEY.

UNITED STATES PATENT OFFICE.

NOAH E. MEREDITH, OF INDIANAPOLIS, INDIANA.

VEHICLE-WHEEL.

No. 910,009.	Specification of Letters Patent.	Patented Jan. 19, 1909.

Application filed April 4, 1908. Serial No. 425,114.

*To all whom it may concern:*

Be it known that I, NOAH E. MEREDITH, a citizen of the United States, residing at Indianapolis, in the county of Marion and State of Indiana, have invented certain new and useful Improvements in Vehicle-Wheels; and I do declare the following to be a full, clear, and exact description of the invention, reference being had to the accompanying drawings, and to the figures of reference marked thereon, which form a part of this specification.

This invention relates to wheels for road vehicles such as automobiles, wagons and carriages and has reference particularly to spring-cushion wheels of the type that are designed to practically serve the purposes of wheels having pneumatic tires.

The object of the invention primarily is to provide an improved wheel of the above mentioned character that will be adapted to be constructed so as to be reliable in use and at reasonable cost of manufacture, and which may readily be repaired if necessary at relatively small expense, an object being to provide a durable and economical spring-cushion wheel, and particularly one that will not be liable to stick fast in soft ground.

With the above mentioned and other objects in view the invention consists in a spring-cushion wheel having a novel housing for the springs and comprising other improvements relating to the arrangements of the springs; the invention consisting further in certain novel parts and combinations and arrangements of parts, as hereinafter particularly described and defined in the claims appended hereto.

Referring to the drawings, Figure 1 is an elevation of the inner side of the improved wheel; Fig. 2, a fragmentary sectional view on the line A A in Fig. 1; Fig. 3, a sectional view on the line B B in Fig. 1 and having portions in section on a different plane; Fig. 4, an elevation of the principal portions without the inner side plates and hub; Fig. 5, a sectional view on the line C C in Fig. 3 with a number of the springs omitted; Fig. 6, a fragmentary sectional view on the plane of the line D in Fig. 4; Fig. 7, an end elevation of one of the elements to which springs are connected for preventing rotation of the hub and the rim of wheel relatively in contrary directions; Fig. 8, a perspective view of the spring-seat ring of the hub, and Fig. 9 a perspective view of the hub and web thereof.

Similar reference characters throughout the different figures of the drawings designate corresponding elements or features of construction.

The improved wheel will be adapted to be used on an axle 1 of any desired form of construction either to rotate on the axle or to be secured thereto as may be necessary, the wheel comprising a hub 2 having an integral web 3 on one end thereof and provided with braces 4 extending from the outer side of the hub to the inner side of the web, and when necessary an axle-box 5 is inserted in the hub and adapted to rotate on the axle. The web has a plurality of threaded holes 6 therein near the hub, and the periphery of the web has a suitable number of notches 7 therein and also bolt-holes 8 near the periphery of the web. When the wheel is adapted to rotate on the axle the latter will be provided as usual with a nut 9. An annular spring-seat ring 10 is provided that has threaded bolt-holes 11 therein and is secured to the web 3 by means of screws 12 having counter-sink heads 12' and are inserted through the holes 8. The ring has any desired number of spring-seats 13 on the periphery thereof and the ring has also a flange 14 extending beyond the periphery thereof at the side of the ring opposite to that which is secured to the web 3, the flange being designed to form a substantial guide bearing. The periphery of the ring is provided with a suitable number of devices whereby to connect springs to the ring, each device preferably comprising two jaws 15 and 15' having each a bolt-hole 16 therein in which is inserted a clamp-bolt 17, and also other similar but longer jaws 18 and 18' having each a bolt-hole 19 therein, in which is inserted a clamp-bolt 20.

The front or outer side of the wheel comprises a disk 21 that has an integral wheel-rim 22 thereon that is somewhat larger in diameter than the ring 10 and extends around the ring, the disk 21 being arranged slidingly against the flange 14. The wheel-rim preferably has a flange 23 extending from the side thereof that is connected to the disk 21 to adapt the wheel for holding a solid rubber or cushion tire 24 on the rim, and obviously when metallic tires are preferred the flange 23 may be omitted. The inner side of the rim 22 has a suitable number of spring-seats 25 formed thereon and it also is provided with ears 26 having threaded bolt-holes 27 therein. An annular housing-plate 28 is secured rigidly by bolts 29 to the inner side of the rim 22, the bolts being connected to the ears 26. The plate extends outwardly beyond the rim so as to practically form a flange 30 with respect to the rim for assisting in holding the rubber-tire on the rim and permitting the tire to be conveniently removed and replaced by a new one when required. The plate bears slidingly against the outer side of the web 3 and closes the space between the ring 10 and the rim 22 and prevents mud or foreign substances from entering the space, and the plate has an offset portion 31 that extends opposite to the web 3 towards but not to the axis of the hub, there being an opening 32 therein. An annular packing-washer 33 composed of suitable material is secured against the outer side of the web 3 by means of screw-bolts 34 inserted in the holes 6, and the washer extends between the web and the offset portion 31 of the plate 28, so that the offset portion may slide against the washer, and preferably a metallic collar 35 is placed between the washer and the head of the bolts 34 so as to firmly hold the washer in place. The washer preferably extends to the axle 1.

The inner side of the rim 22 is provided with suitable devices for connecting springs to the rim similar to the jaws above described and may be formed integrally therewith but preferably comprise a plate 36 that is secured by rivets 37 to the rim, the plate having two pairs of jaws 38 and 38′ on the ends thereof having clamp-bolts 39, and a pair of longer jaws 40 and 41′ near one end of the plate that are provided with a clamp-bolt 41, these jaws being opposite to a pair of jaws 18 and 18′ that are on the ring 10. The shorter jaws are adapted to connect the cushion-springs 42, which are provided, to the rim, there being a suitable number of the springs distributed around the ring 10 and engaging the seats 13 and also in engagement with the seats 25 of the rim, each spring having a terminal projection 43 at one end thereof that is inserted between the jaws 15 and 15′ and secured by the bolt 17, the opposite end of the spring having a terminal projection 43′ inserted between two jaws 38 and 38′ and secured by the bolt 39. Springs 44 have each a terminal end 45 inserted between two jaws 18 and 18′ and secured by a bolt 20, and a terminal end 45′ inserted between two jaws 40 and 40′ and secured by the bolt 41, the springs being adapted to compensate for the lack of parallel movement as between the jaws of the ring 10 and those of the rim 22 when the rim approaches or recedes from the ring in operation, or vice-versa; and it will be understood that the springs 44 may be sufficiently stiff so that but slight relative rotative movements can occur as between the rim and the ring during operation of the wheel; also, the springs 44 permit of vertical movements of the axle or of the wheel rim without the jaws of one part interfering with the jaws of the other part which form abutments against which the springs are seated.

When desired the disk 21 may have a central opening 46 therein so that access may be had to the outer end of the wheel-hub or to the axle-nut, the opening being normally closed by a cap 47 that is attached by screws 48 to the outer plate 21.

It is to be understood that the arrangement of the springs 44 is such that a number are arranged to exert force in one direction and an equal number are arranged so as to exert force in an opposite direction, and any desired number of springs obviously may be provided.

In practical use the cushion-springs 42 permit the rim to slightly rise or fall without transmitting objectionable jars to the axle when passing over uneven ground, while desirable frictional resistance of the sliding or telescopic housing portions of the wheel prevent over-sensitiveness of the spring action, resulting in smooth and steady movements of the rim with respect to the axle in vertical directions. The compensating-springs between the abutments of the spring-seat ring and the rim permit a free action of the two principal parts relatively one to the other through all points of the revolution of the wheel, while providing connections whereby the hub when secured to a driving axle can rotate the rim in order to propel the vehicle. It will be understood of course that the sliding surfaces of the side parts of the wheel may be suitably lubricated and that dust be excluded therefrom by the packing-ring.

Having thus described the invention what is claimed as new, is—

1. A wheel including a hub having a web thereon, a spring-seat ring extending about the hub and attached at one side thereof to the inner side of the web, a disk having sliding contact with the opposite side of the ring and having also a wheel-rim thereon that surrounds the ring, an annular plate attached to the rim opposite to the disk and having sliding engagement with the outer side of the web, and springs mounted between the ring and the rim.

2. A wheel including a hub having a web thereon, a spring-seat ring extending about the hub and attached to the web, a disk having sliding contact with the ring and having also a wheel-rim thereon that surrounds the ring, an annular plate attached to the rim and having sliding engagement with the web, springs mounted between the ring and the rim, and means between the ring and the rim acting to yieldingly prevent rotative movements of the ring and rim relatively one to the other.

3. A wheel including a hub having a spring-seat ring connected rigidly therewith, a wheel-rim extending about the ring and movable with respect thereto, cushion-springs mounted between the ring and the rim, a housing connected with the ring and the rim and therewith forming an inclosure for the springs, and means between the ring and the rim acting to yieldingly prevent rotative movements of the ring and rim relatively one to the other.

4. A wheel including a hub having a web on an end thereof, a spring-seat ring extending about the hub and attached to the inner side of the web, a disk having sliding contact with the ring and extending near to the opposite end of the hub, a wheel-rim rigid on the disk and extending about the ring, springs seated against the ring and the rim, a packing washer bearing against the outer side of the web, and an annular plate attached to the rim and having sliding contact with the outer side of the web and also against the outer side of the washer.

5. A wheel including a hub having a web thereon, a spring-seat ring attached to the web and having pairs of jaws thereon, a disk having sliding contact with the ring, a wheel-rim rigid on the disk and extending about the ring and provided with pairs of jaws on the inner side thereof, springs seated against the ring and the rim and having each a terminal projection at one end thereof that is clamped between a pair of jaws of the ring and a terminal projection at the opposite end thereof that is clamped between a pair of jaws of the rim, and an annular plate attached to the rim and having sliding contact with the web.

6. A wheel including a hub having a web on one end thereof, braces extending from the hub to the web, the periphery of the web having notches therein, a spring-seat ring attached at one side thereof to the inner side of the web, a disk having sliding contact with the opposite side of the ring, a rim rigid on the disk and extending about the ring and the periphery of the web, the inner side of the rim having ears thereon opposite to the notches, springs seated on the ring and against the rim, an annular plate engaging the rim and having sliding contact with the outer side of the web, and bolts extending through the plate and into the ears and securing the plate to the rim.

7. A wheel including a hub having a web thereon, a spring-seat ring attached to the web and having abutments on the periphery thereof, a disk having sliding contact with the ring, a rim rigid on the disk and extending about the ring and provided with abutments on the inner side thereof, springs seated against the ring and the rim, an annular plate attached to the rim and having sliding contact with the outer side of the web, and a plurality of springs arranged between the abutments of the ring and the rim and connected thereto, some of the springs acting in one direction and the remaining springs acting in the opposite direction.

8. A wheel comprising a hub, a web on one end of the hub, braces extending from the hub to the web, a spring-seat ring attached at one side thereof to the inner side of the web and having a flange on the opposite side thereof, a disk in sliding contact with the flange and having a central opening therein near the opposite end of the hub, a cap attached to the disk and closing the opening, a rim rigid on the disk and extending about the ring, springs seated against the ring and the rim, and an annular plate attached rigidly to the rim and having sliding contact with the outer side of the web.

In testimony whereof, I affix my signature in presence of two witnesses.

NOAH E. MEREDITH.

Witnesses:
ADOLPH EMHARDT,
JOHN EMHARDT.